United States Patent [19]
Olofsson

[11] Patent Number: 5,816,189
[45] Date of Patent: Oct. 6, 1998

[54] AUTOMATIC MILKING MEANS REMOVAL DEVICE

[75] Inventor: Hans Olofsson, Huddinge, Sweden

[73] Assignee: Alfa Laval Agri AB, Tumba, Sweden

[21] Appl. No.: 615,223

[22] PCT Filed: Sep. 14, 1994

[86] PCT No.: PCT/SE94/00855

§ 371 Date: Mar. 14, 1996

§ 102(e) Date: Mar. 14, 1996

[87] PCT Pub. No.: WO95/07607

PCT Pub. Date: Mar. 23, 1995

[30] Foreign Application Priority Data

Sep. 16, 1993 [SE] Sweden .................................. 9303022

[51] Int. Cl.[6] ........................................................ A01J 3/00
[52] U.S. Cl. ........................................ 119/14.08; 475/299
[58] Field of Search .............................. 119/14.1, 14.08, 119/14.18; 475/317, 318, 299, 298

[56] References Cited

U.S. PATENT DOCUMENTS

| | | |
|---|---|---|
| 3,603,292 | 9/1971 | Finch . |
| 3,789,798 | 2/1974 | Reisgies et al. . |
| 4,502,353 | 3/1985 | Beaudoin ................................ 475/298 |
| 4,651,580 | 3/1987 | Deane ..................................... 475/299 |
| 4,791,833 | 12/1988 | Sakai et al. ............................. 475/299 |
| 4,976,671 | 12/1990 | Andersson .............................. 475/299 |
| 5,006,100 | 4/1991 | Brandt et al. ........................... 475/299 |

FOREIGN PATENT DOCUMENTS

| | | |
|---|---|---|
| 138428 | 5/1975 | Norway . |
| PCTSE9200457 | 6/1992 | WIPO . |

*Primary Examiner*—John G. Weiss
*Assistant Examiner*—David J. Cho
*Attorney, Agent, or Firm*—Hovey, Williams, Timmons & Collins

[57] ABSTRACT

A device for automatic removal of milking equipment from an animal's udder, comprising a motor (1) and a removal member (3) rotatable by the motor. According to the invention, a coupling device (K) is adapted to keep the removal member (3) operably connected to the motor and to keep the removal means disconnected from the motor, respectively.

11 Claims, 4 Drawing Sheets

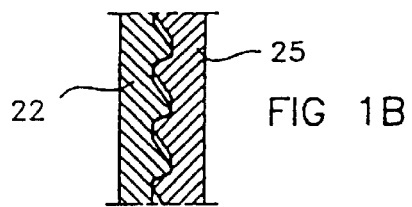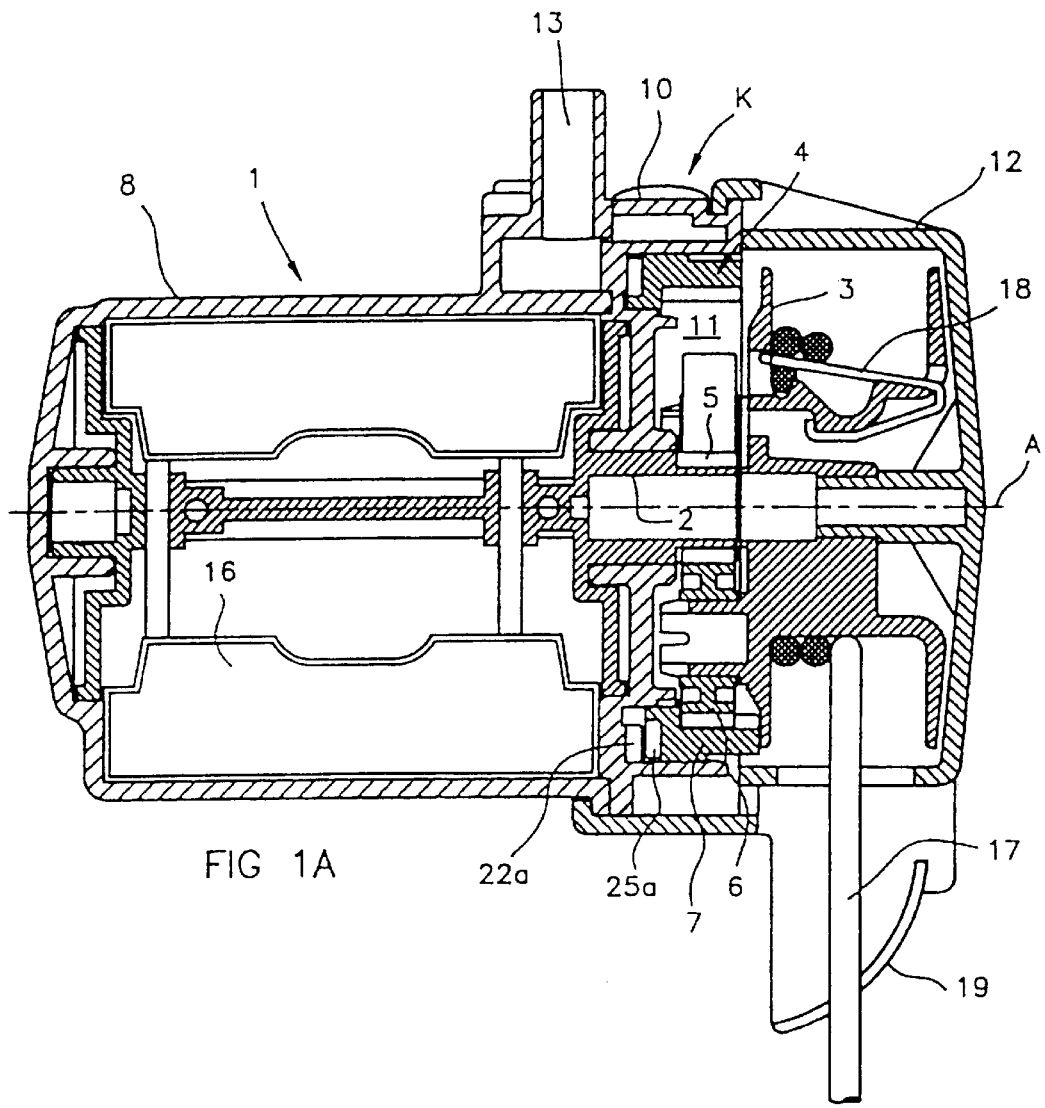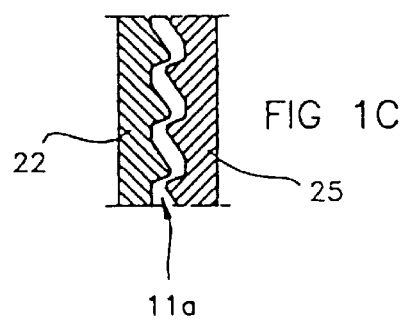

AUTOMATIC MILKING MEANS REMOVAL DEVICE

FIELD OF THE INVENTION

The present invention relates to a device for automatic removal of a milking means from an animal's udder, comprising a motor and a removal means rotatable by the motor in a first direction, the removal means being adapted to pull the milking means off the udder when the milking means is rotated by the motor in said first direction, and to admit movement of the milking means for its attachment on to the udder when the removal means is rotated in an opposite, second direction.

THE TECHNOLOGICAL STATE OF THE ART

Such a removal device, which is known from WO 93/00002, has great advantages, since it may be designed in very small dimensions and with a low weight. In the known removal device, the removal means comprises a cord drum with a cord adapted to be connected to the milking means. However, the known removal device has a drawback, since it has appeared that a mechanical resistance must be overcome each time the cord is to be pulled out from the cord drum in connection with attachment of the milking means onto the teats of an animal. The reason for this resistance is the motor, which is connected to the cord drum during the operation thereof. When pulling out the cord from the cord drum it may certainly be considered that the resistance of the removal device is not particularly strong, but in connection with repeated pull outs it has, after all, appeared that the resistance may be strenuous for the milker to overcome.

OBJECT OF THE INVENTION

The object of the present invention is to achieve an automatic removal device of the above described kind, which removes the above described disadvantage of the said known removal device.

SUMMARY OF THE INVENTION

This object is achieved by a device of the initially described kind, which is characterized by a coupling device adapted to keep the removal means operably connected to the motor when the removal means is rotated by means of the motor in said first direction and to keep the removal means disconnected from the motor when the removal means is rotated in said second direction. Thus, the removal means can be rotated in said second direction without resistance from the motor when the motor is not in operation, whereby the milker easily can move the milking means for its attachment onto the udder.

Advantageously, there is a means provided for influencing the coupling device such that the removal means is automatically connected to the motor when driven for rotation of the removal means in said first direction, said means comprising a source of positive or negative pressure adapted for pneumatic influence of the coupling device.

Preferably, the motor is pneumatically operable for rotation of the removal means in said first direction and is connectible to said source. The coupling device is in this connection adapted to operably connect the removal means to the motor, substantially simultaneously with the connection of the motor to said source. This can suitably be achieved by pneumatically connecting the coupling device and the motor to each other.

The motor may be a rotary motor, wherein the coupling device is interconnected between the motor and the removal means. In this case the coupling device suitably comprises a gear change device adapted to give the removal means a speed of rotation which is lower than that of the motor, whereby the motor can be designed compact, at the same time as a desired torque can be achieved.

Advantageously, said source is a vacuum source, which enables use of existing vacuum system in the milking stall.

BRIEF DESCRIPTION OF THE DRAWINGS

The invention will now be closer described with reference to the accompanying drawings, in which FIG. 1A is a view of a longitudinal section through a removal device according to a preferred embodiment of the invention, FIG. 1B shows a detail in enlargement of a coupling device in engaged state of the removal device according to FIG. 1A, FIG. 1C shows the same detail as shown in FIG. 1B, but with the coupling device in unengaged state.

DETAILED DESCRIPTION OF PREFERRED EMBODIMENTS

Figure 2:
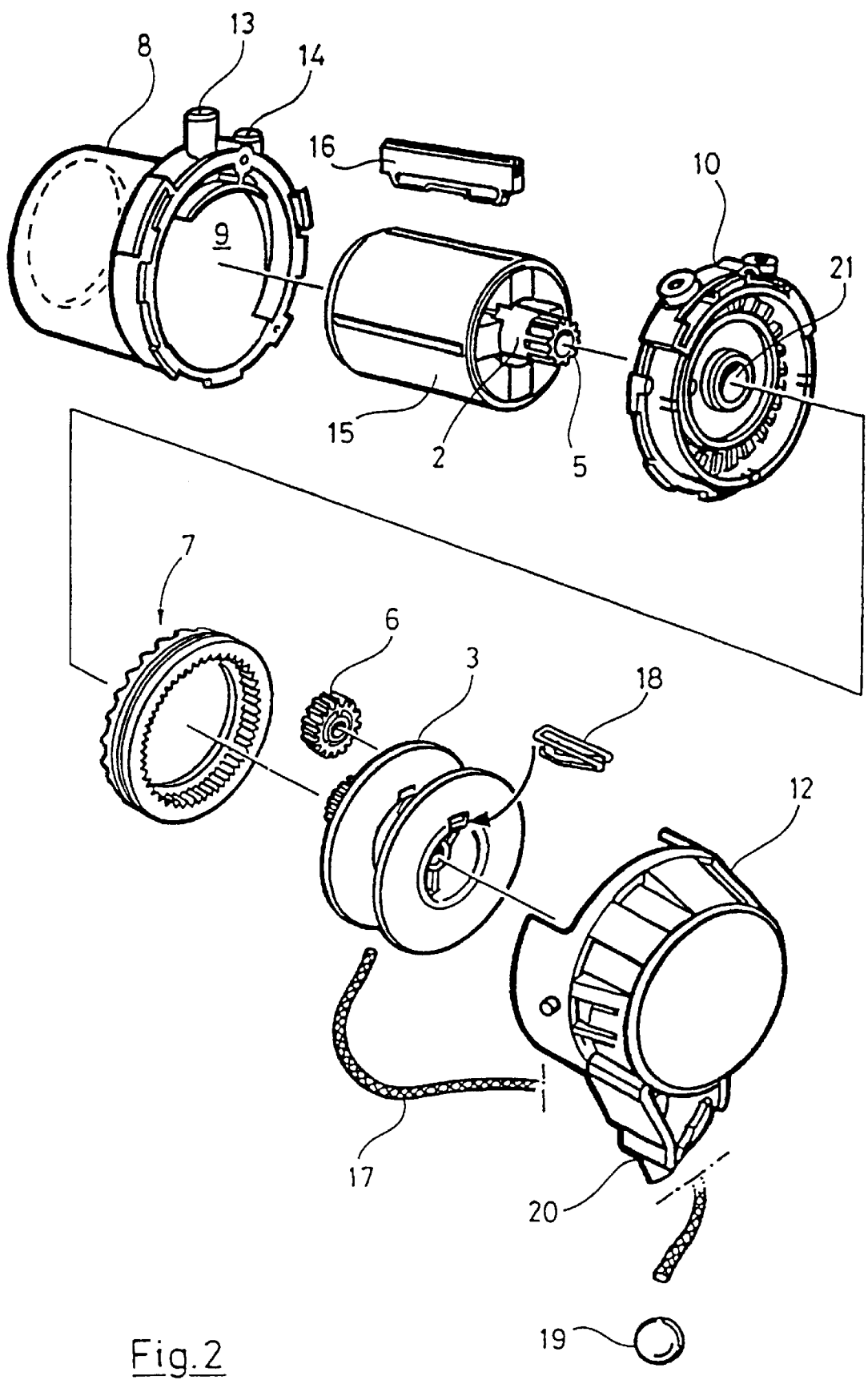
FIG. 2 is an exploded view illustrating details of a motor, a gear change device, a housing for the gear change device, and a removal means of the removal device according to FIG. 1A.

The removal device according to the invention shown in FIGS. 1A and 2 comprises a motor 1 with a drive shaft 2, which is connected to a removal means in the form of a cord drum 3 via a gear change device 4, for achieving required torque. From i.e. a spacial point of view this gear change device 4 has been chosen to comprise a planetary gearing with a housing belonging thereto, even though other gear change devices would be possible to use.

The planetary gearing 4 comprises a first gear change means in the form of a sun wheel 5 connected to the drive shaft 2 of the motor, a second gear change means in the form of three planet wheels 6 connected to the cord drum 3 and a third gear change means in the form of a crown wheel 7 adapted to be releasably engaged with the housing of the planetary gearing.

The motor 1 is equipped with a housing 8, which forms a cylindrical chamber 9. One end of the housing 8 of the motor is provided with a wall, which also forms one of the walls for the housing of the planetary gearing and, hence, constitutes an intermediate wall 10 between the chamber 9 of the motor and the chamber 11 of the planetary gearing 4.

The housing of the planetary gearing is formed by the intermediate wall 10 and a casing 12, wherein the chamber 11 of the planetary gearing also houses the cord drum 3. The intermediate wall 10 and the crown wheel 7 delimit a part chamber 11a of the chamber 11 (see FIG. 1C). The housing 8 of the motor 1 is provided with an inlet 13 and an outlet 14 for connection to a source of vacuum (not shown) for operation of the motor.

In the motor's chamber 9 there is arranged a rotor 15 provided with vanes 16 radially movable in relation to an axis A through the rotor 15, which axis is coaxial with the motor's 1 driving shaft 2. The rotor is arranged eccentrically in the motor's chamber 9, so that the vanes 16 are forced to move in a radial direction during rotor's 15 rotation. When connecting the vacuum source, this causes a pressure difference in the motor's chamber 9. The pressure difference acts upon the vanes 16, which in turn force the rotor 15 to rotate.

A cord 17 is at its one end releasably connected to the cord drum 3 by means of a connection means 18. The connection means 18 is arranged such that the cord 17 comes loose from the cord drum 3 if the cord is exposed to a too large, external pulling force when the cord is completely pulled out from the cord drum 3, and is solely held in place by means of the connection means 18. The cord 17 is at its other end intended to be connected to the milking means (not shown), as described in WO 93/00002.

The cord 17 is provided with a stop member in the form of a ball 19. The ball 19 prevents the milking means from hitting the removal means during winding the cord 17. The casing 12 is provided with a catch means 20, through which the cord 17 freely runs, but which does not let the ball 19 through. In the motor's 1 rest position, which will be closer described below, the catch means 20 catches the ball 19 and prevents the cord 17 from being unwound from the cord drum 3. In this way, the whole weight of the milking means can be taken up by the removal device via the catch means 20, when the motor 1 is in said rest position.

Figure 3A:
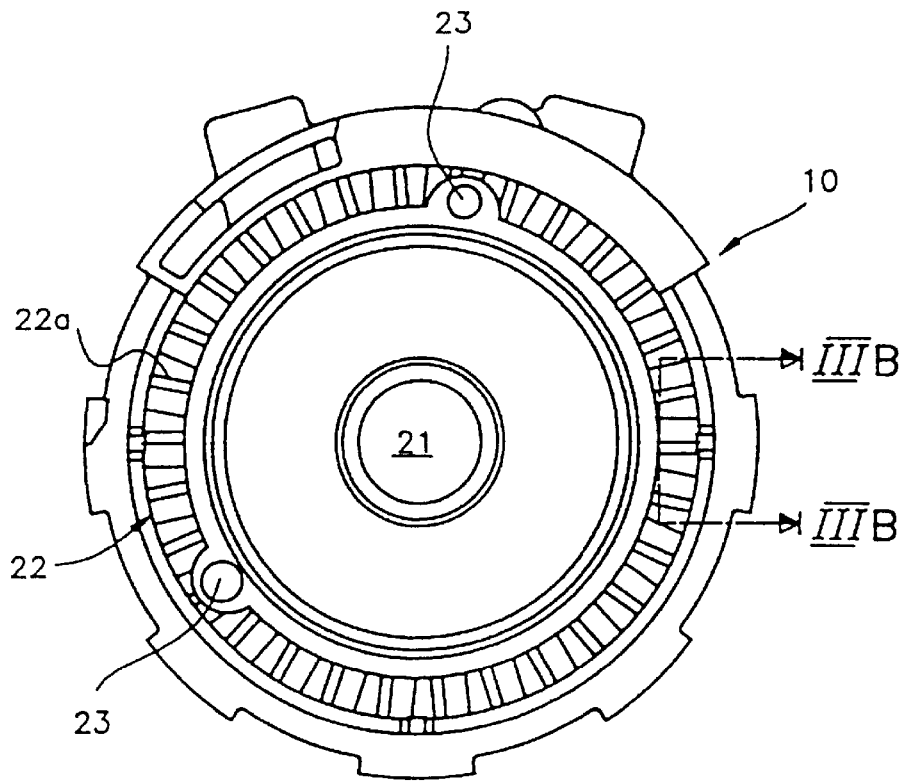
FIG. 3A shows a view of the interior of the housing illustrated in FIG. 2.
Figure 3B:
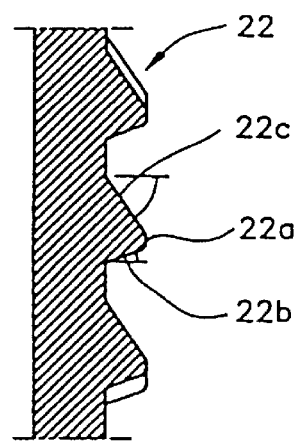
FIG. 3B shows a section in enlargement along the line IIIB—IIIB in FIG. 3A, FIGS. 4A and 4B show views of two opposite sides of a gear change means of the gear change device illustrated in FIG. 2.

FIG. 3A is a front view of the part of the intermediate wall 10, which forms an inner, axially directed wall of the housing 10, 12 of the planetary gearing 4. Centrally in the intermediate wall 10 an opening 21 is formed for reception of the motor's driving shaft 2 with the sun wheel 5 arranged thereon. The intermediate wall 10 is at its periphery provided with a ring 22 of an axially directed friction enhancing means, which ring 22 is coaxial with the opening 21 (see FIG. 3B). The intermediate wall 10 is furthermore provided with two passages 23 for pneumatically connecting said part chamber 11a to the motor's 1 chamber 9. Alternatively, more or less passages than two may certainly be provided in the intermediate wall 10.

Figure 4A:
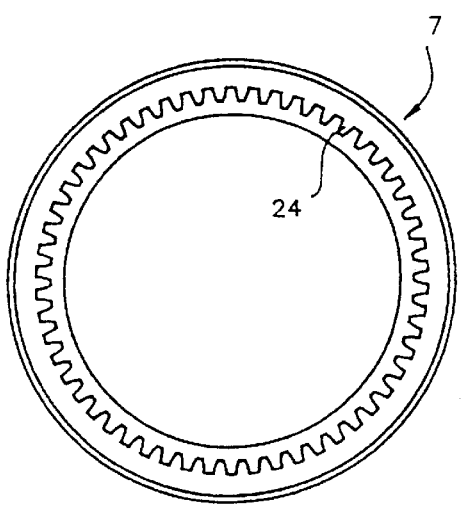
FIG. 4C shows a section in enlargement along the line IVC—IVC in FIG. 4B.
Figure 4B:
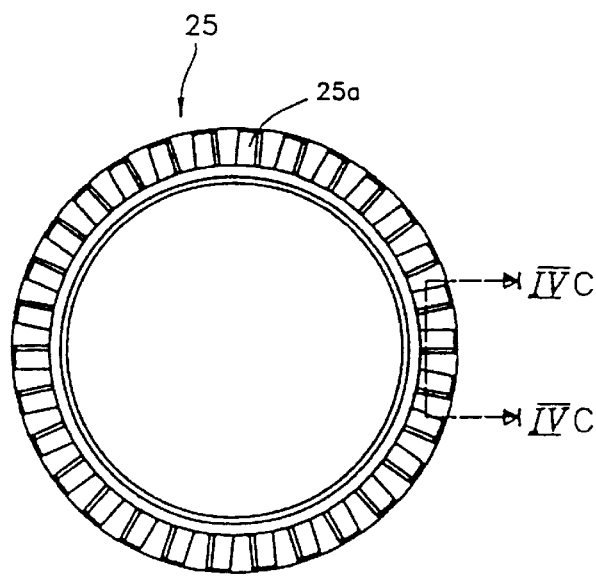
Figure 4C:
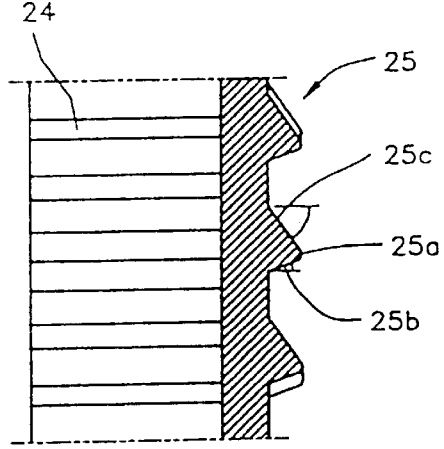

In FIG. 4A is shown the planetary gearing's 4 crown wheel 7 seen from the direction which faces away from the intermediate wall 10 and towards the cord drum 3. The crown wheel 7 is provided with a ring 24 of teeth directed radially inwards. In FIG. 4B is shown the side of the planetary gearing's crown wheel 7, which faces the intermediate wall 10. On this side the crown wheel 7 is at its periphery provided with a ring 25 of an axially directed friction enhancing means, which ring is coaxial with the axis of the crown wheel 7 (see FIG. 4C).

The friction enhancing means on the intermediate wall 10 and the crown wheel 7, respectively, are shown in the FIGS. 3A, 3B, 4B and 4C as teeth 22a, 25a having a form substantially similar to a saw tooth, i.e. with non uniformly inclined back rakes, 22b, 25b and 22c, 25c, respectively. The back rakes of each tooth form angles α and β, respectively, with the base of the tooth, α being about 20° and β being about 55°. For reasons explained below these friction enhancing means do not need to consist of teeth 21a, 25a, but could as well on the one hand comprise plain, substantially plane, friction surfaces and on the other hand comprise a mechanical coupling in the form of a pin or the like.

Figure 5:
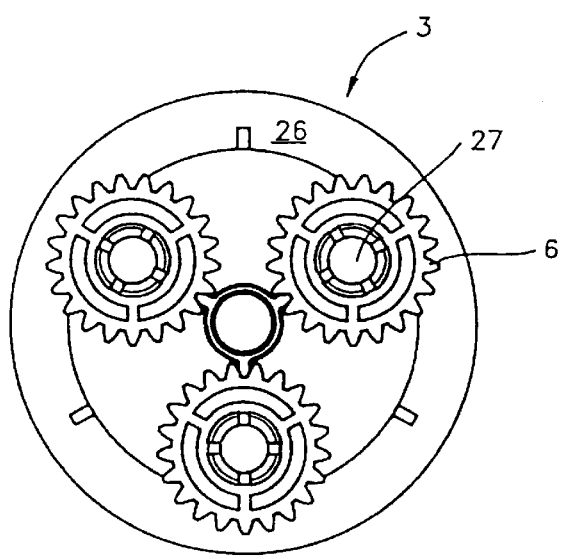
FIG. 5 shows a view of a further gear change means of the gear change device mounted on the removal means illustrated in FIG. 2.

FIG. 5 illustrates an end wall 26 of the cord drum 3, provided with three axes 27, each being provided with a planet wheel 6 with teeth. The planet wheels 6 fit between the crown wheel 7 and the sun wheel 5. Of course the teeth of the crown wheel 7 and the sun wheel 5 fit the teeth of the planet wheels 6.

FUNCTION

On finished milking, which is sensed by a milk flow meter known per se, but not shown, the removal device receives a signal to start the motor 1 for winding the cord 17 onto the cord drum 3. The milking means, which is connected to the cord 17, is hereby pulled away from the teats of the animal.

When the signal is given that the motor 1 shall start, the motor 1 is connected to a source of vacuum, which is suitably the same as the one that operates the milking means. The negative pressure which is thereby created in the chamber 9 of the motor drives the motor 1 such that it rotates. Via the passages 23 in the intermediate wall 10 the chamber 11 of the planetary gearing 4 is pneumatically connected to the motor's chamber 9, such that also the planetary gearing's 4 chamber, like its part chamber 11, is exposed to a negative pressure. In consequence, the crown wheel 7, which is arranged closely to the intermediate wall 10 and in front of the said passages 23, is sucked against the intermediate wall 10 and is anchored on this.

Accordingly, the crown wheel 7 of the planetary gearing 4 works together with the intermediate wall 10 as parts of a coupling device K between the motor 1 and the cord drum 3. It shall be remarked, though, that the crown wheel 7 need not necessarily be anchored in a pneumatical way. The anchorage could as well be achieved in a plain mechanical way by locking by means of pins or by a clamping means of any known kind. Alternatively, such an anchorage would be possible to accomplish in an electro-mechanical way for example by means of a magnet or a solenoid, which pushes or pulls the crown wheel 7 against the intermediate wall (see FIG. B).

The engagement of the crown wheel 7 with the intermediate wall 10 is achieved by means of two differently directed forces, namely a relative to the crown wheel 7, axially acting, retaining force, which is achieved by means of the negative pressure in the part chamber 11a, and a force acting in the circumferential direction of the crown wheel 7, which force is achieved by means of the friction enhancing means. Outgoing from this it is understood that the said engagement can be achieved by means of a frictional engagement between plane friction surfaces. In such a case, the friction enhancing means may consist of plane friction coatings. However, it is desirable that different properties of engagement in different directions of rotation of the crown wheel 7 be achieved and for this reason the differently back raked teeth 22a, 25a are preferred. The reason for this is that the substantially axially directed back rakes 22b, 25b of the teeth on the crown wheel 7 and the intermediate wall 10 together provide a relatively stable hooking of the teeth 22a, 25a in the direction of winding, whereas the more sloping back rakes 22c, 25c form an extra protection against overload for the removal device, since they will without difficulty disconnect by a load directed opposite to the winding direction.

Having the crown wheel 7 anchored on the intermediate wall 10, the sun wheel's 5 rotation of the planet wheels 6 results in rotation of the last mentioned wheels along the crown wheel 7 and about the sun wheel 5, such that the cord drum 3 is turned at a rotational speed which is lower than that of the motor 1. The cord drum 3 thus winds the cord 17 so that the milking means is pulled off the animal's udder. Before the cord is pulled in too far on the cord drum 3, it is stopped by the catch means 20, which catches the ball 19 arranged on the cord 17.

When the milker is to move the milking means and the removal device to the next animal to be milked, the milker looses the connection means from the vacuum source, which results in that the motor 1 assumes the above mentioned rest position and is no longer driven, since there is no longer a negative pressure in the chamber 9 of the motor. Furthermore, no negative pressure will be transmitted through the passages 23 in the intermediate wall 10, which means that the crown wheel 7 is disengaged from the intermediate wall 10 (see FIG. 1C).

When the crown wheel 7 now is freely movable and can move with less friction than the motor 1 on which the sun wheel 5 is arranged, the planet wheels 6 rotate about the sun wheel 5 while this only moves insignificantly or not at all. Accordingly, the cord drum 3 is now disengaged from the motor 1. The ball 19 is still in the catch means 20, which prevents rotation of the disengaged cord drum 3.

When the next animal is to be milked, the milker first disengages the ball 19 from the catch means 20. Owing to the freely movable crown wheel 7 the milker can thereafter pull out the cord from the removal means without resistance from the motor 1 and the planetary gearing 4. The milking means which is now connected to the source of vacuum, will be attached to the animal's teats, where it remains until a signal is given for finished milking.

The invention is not delimited to the embodiment shown here. Hence, the crown wheel 7 may be arranged to be affected by a positive pressure instead of by vacuum. It is also not necessary to use a pneumatic sliding vane motor, but a pneumatic cylinder, an electrical motor or a spiral spring would be possible to use in order to achieve rotation of the cord drum for the winding of the cord.

Similarly anyone of the three said gear change means may comprise anyone of the said wheels, i.e. the sun wheel, the planet wheel or the crown wheel, may be permutedly connected to the motor, the cord drum or the housing of the gear change device.

It is claimed:

1. A device for automatic removal of a milking means from an animal's udder, comprising:
    a motor;
    a removal means rotatable by the motor in a first direction, the removal means being adapted to pull the milking means off the udder when the removal means is rotated by the motor in said first direction, and to admit movement of the milking means for its attachment onto the udder when the removal means is rotated in an opposite, second direction;
    a coupling device adapted to keep the removal means operably connected to the motor when the removal means is rotated by means of the motor in said first direction and to keep the removal means disconnected from the motor when the removal means is rotated in said second direction; and
    means for influencing the coupling device such that the removal means is automatically connected to the motor when the latter is driven for rotating the removal means in said first direction, said influencing means comprising a source of positive or negative pressure adapted for pneumatic influence on the coupling device,
    wherein the motor is pneumatically operable for rotation of the removal means in said first direction and is connectible to said source, and in that the coupling device is adapted to operably connect the removal means to the motor, substantially simultaneously with the connection of the motor to said source.

2. A device according to claim 1, characterized in that the motor is a rotary motor, and that said coupling device is interconnected between the motor and the removal means, said coupling device comprising a gear change device adapted to give the removal means a rotational speed which is lower than that of the motor.

3. A device according to claim 1, characterized in that the coupling device and the motor are pneumatically connected to each other.

4. A device according to claim 3, characterized in that the motor is a rotary motor, and that said coupling device is interconnected between the motor and the removal means, said coupling device comprising a gear change device adapted to give the removal means a rotational speed which is lower than that of the motor.

5. A device for automatic removal of a milking means from an animal's udder, comprising:
    a motor;
    a removal means rotatable by the motor in a first direction, the removal means being adapted to pull the milking means off the udder when the removal means is rotated by the motor in said first direction, and to admit movement of the milking means for its attachment onto the udder when the removal means is rotated in an opposite, second direction;
    a coupling device adapted to keep the removal means operably connected to the motor when the removal means is rotated by means of the motor in said first direction and to keep the removal means disconnected from the motor when the removal means is rotated in said second direction; and
    means for influencing the coupling device such that the removal means is automatically connected to the motor when the latter is driven for rotating the removal means in said first direction, said influencing means comprising a source of positive or negative pressure adapted for pneumatic influence on the coupling device,
    wherein the motor is a rotary motor, and that said coupling device is interconnected between the motor and the removal means, said coupling device comprising a gear change device adapted to give the removal means a rotational speed which is lower than that of the motor.

6. A device according to claim 5, characterized in that the gear change device is a planetary gearing, which comprises a first, a second and a third gear change means.

7. A device according to claim 6, characterized in that the first gear change means is connected to the motor, that the second gear change means is connected to the removal means and that the third gear change means is movable between a first position, in which it is adapted to be kept non-rotatable, such that the motor is operably connected to the removal means, and in a second position, in which it is adapted to be entrained into rotation by one of the other gear change means, such that the motor is disconnected from the removal means.

8. A device according to claim 7, characterized in that the gear change means comprise a sun wheel, at least one planet wheel and a crown wheel, said sun wheel, planet wheel and crown wheel having parallel axes of rotation, and that the planetary gearing is arranged in a housing, the crown wheel constituting said third gear change means and is axially movable to and from engagement with the housing.

9. A device according to claim 8, characterized in that the housing of the planetary gearing has at least one passage for connection to said source of positive or negative pressure.

10. A device according to claim 9, characterized in that said source is a source of negative pressure and that the housing of the planetary gearing has a wall designed for cooperation with the crown wheel, the crown wheel being adapted to be moved by a negative pressure generated by the source of negative pressure to an engagement with said wall such that the crown wheel is prevented from rotating relative to said housing.

11. A device according to claim 10, characterized in that the motor is a pneumatically operable sliding vane motor comprising a housing forming a cylindrical chamber, a rotor eccentrically arranged in the chamber, and at least a pair of vanes arranged radially movable in the rotor.

* * * * *

UNITED STATES PATENT AND TRADEMARK OFFICE
CERTIFICATE OF CORRECTION

PATENT NO. : 5,816,189

DATED : October 6, 1998

INVENTOR(S) : OLOFSSON, Hans

It is certified that error appears in the above-identified patent and that said Letters Patent is hereby corrected as shown below:

Column 5, line 58, please insert between "means" and "by" -- is rotated --.

Signed and Sealed this

First Day of June, 1999

Attest:

Attesting Officer

Q. TODD DICKINSON

Acting Commissioner of Patents and Trademarks